US009535733B2

(12) United States Patent
Rui et al.

(10) Patent No.: US 9,535,733 B2
(45) Date of Patent: Jan. 3, 2017

(54) PEER-TO-PEER STREAMING AND API SERVICES FOR PLURAL APPLICATIONS

(75) Inventors: Kevin Rui, Shanghai (CN); Wenjie Zhang, Shanghai (CN); Johnathan Ding, Shanghai (CN); Alvin Tang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 708 days.

(21) Appl. No.: 12/809,963

(22) PCT Filed: Dec. 21, 2007

(86) PCT No.: PCT/CN2007/003738
§ 371 (c)(1),
(2), (4) Date: Sep. 23, 2010

(87) PCT Pub. No.: WO2009/079850
PCT Pub. Date: Jul. 2, 2009

(65) Prior Publication Data
US 2011/0010428 A1    Jan. 13, 2011

(51) Int. Cl.
*G06F 15/167*    (2006.01)
*G06F 9/455*    (2006.01)
(Continued)

(52) U.S. Cl.
CPC ........... *G06F 9/45558* (2013.01); *G06F 9/544* (2013.01); *H04L 65/4084* (2013.01); *H04L 67/104* (2013.01); *G06F 2009/45595* (2013.01)

(58) Field of Classification Search
CPC .............. H04L 67/104; H04L 65/4084; G06F 9/45558; G06F 9/544; G06F 2009/45595
(Continued)

(56) References Cited

U.S. PATENT DOCUMENTS 7,783,779 B1 *   8/2010   Scales et al. ................. 709/240
2004/0015966 A1 * 1/2004  MacChiano ........... H04L 69/32
                                                       718/1
(Continued)

FOREIGN PATENT DOCUMENTS

CN    1677979 A    10/2005
EP    1703701 A1   9/2006
(Continued)

OTHER PUBLICATIONS

International Preliminary Report on Patentability for PCT/CN2007/003738 issued Jun. 22, 2010, 5 pages.
(Continued)

*Primary Examiner* — Tonia L Dollinger
*Assistant Examiner* — Steven Nguyen
(74) *Attorney, Agent, or Firm* — Schwabe, Williamson & Wyatt, P.C.

(57) ABSTRACT

Embodiments of apparatuses with a universal P2P service platform are disclosed herein. A unified infrastructure is built in such apparatuses and a unified P2P network may be established with such apparatuses. In various embodiments, such an apparatus comprises a P2P operating system (OS) virtual machine (VM) 202 and a client guest operating system (OS) virtual machine (VM) 204. There is a collection of P2P services in the P2P OS VM 202 and this VM 202 works as a peer node in the P2P network. There is a collection of API services in the client guest OS VM 204 and this VM 204 interacts with various P2P applications. The two VMs communicate with each other via a shared memory 216 and a virtual machine manager 214. In various embodiments, the apparatus further includes a security checker 318 located in the P2P OS VM 302. Other embodiments are also described.

18 Claims, 4 Drawing Sheets

(51) Int. Cl.
*G06F 9/54* (2006.01)
*H04L 29/08* (2006.01)
*H04L 29/06* (2006.01)

(58) Field of Classification Search
USPC .......................................................... 709/213
See application file for complete search history.

(56) References Cited

U.S. PATENT DOCUMENTS

| | | | |
|---|---|---|---|
| 2004/0255027 A1* | 12/2004 | Vass et al. .................... | 709/226 |
| 2005/0050336 A1* | 3/2005 | Liang et al. ................. | 713/188 |
| 2005/0218739 A1 | 10/2005 | Maddin et al. | |
| 2005/0289648 A1* | 12/2005 | Grobman ................ | G06F 21/53 726/12 |
| 2006/0174120 A1* | 8/2006 | Rippy et al. .................. | 713/171 |
| 2007/0105589 A1* | 5/2007 | Lu .............................. | 455/556.2 |
| 2007/0113096 A1* | 5/2007 | Zhu et al. ..................... | 713/180 |
| 2007/0140263 A1* | 6/2007 | Mitome ............. | H04L 12/4645 370/395.53 |
| 2008/0307094 A1* | 12/2008 | Karonen et al. ............. | 709/226 |
| 2008/0313318 A1* | 12/2008 | Vermeulen et al. .......... | 709/223 |
| 2009/0094316 A1* | 4/2009 | Chen ........................ | G06F 9/465 709/203 |
| 2009/0172820 A1* | 7/2009 | Watson ........................... | 726/26 |
| 2009/0204964 A1* | 8/2009 | Foley et al. ..................... | 718/1 |
| 2009/0265414 A1* | 10/2009 | Bryan .................. | H04L 67/104 709/202 |
| 2009/0271627 A1* | 10/2009 | Cohen et al. ................. | 713/171 |
| 2013/0298255 A1* | 11/2013 | Kulakowski et al. .......... | 726/26 |

FOREIGN PATENT DOCUMENTS

| | | |
|---|---|---|
| KR | 20060064781 A | 6/2006 |
| KR | 20070017830 A | 2/2007 |
| WO | WO2006/043784 A1 * | 4/2006 |

OTHER PUBLICATIONS

Office Action for EP Application 07855748.5 mailed Sep. 24, 2010, 2 pages.
PCT International Search Report for PCT/CN2007/003738 (Publication WO2009/079850), Aug. 28, 2008, 2 pages.
Extended European Search Report for EP 07855748.5, dated Nov. 15, 2012, 11 pages.
The Xen Team: "Xen Interface Manual Xen v2.0 for x86," University of Cambridge, UK, XP002686139, 2004, downloaded from URL: http://wiki.xensource.com/mediawiki/images/b/b3/xen_2_ interface.pdf, retrieved Oct. 29, 2012.
Office Action mailed Dec. 3, 2012 for Chinese Application No. 200780102386.5, 7 pages.
Office Action mailed Aug. 20, 2013 for Chinese Application No. 200780102386.5, 9 pages.
Office Action mailed Mar. 13, 2014 for Chinese Application No. 200780102386.5, 3 pages.
Office Action mailed Mar. 26, 2015 for European Patent Application No. 07855748.5, 8 pages.

* cited by examiner

PEER-TO-PEER STREAMING AND API SERVICES FOR PLURAL APPLICATIONS

TECHNICAL FIELD

Embodiments of the present invention relate to field of networking, in particular, to peer-to-peer streaming and API services for providing peer-to-peer networking to multiple applications on a platform.

BACKGROUND

Peer-to-peer (P2P) technology has generated a revolution in the area of network communication and continues drawing more and more attention. P2P computing provides an alternative to the traditional client/server network architecture. In a P2P network, each peer node, such as a computer, works as a client or as a server within the context of a given application. P2P applications build functions such as storage, computation, messaging, security, and file distribution, through direct exchanges between peer nodes. A peer node may initiate requests and may respond to requests from other peer nodes in the network. P2P technology provides many benefits to network communications, such as broader sharing scope of information and efficient utilization of network resources.

Though P2P technology is demonstrated to be extremely promising, several issues remain unsolved. One of the problems is that P2P applications that originate from different sources are usually not interoperable with one another, and each may have its own set of basic services and plug-ins. A more significant problem is that developers of new P2P applications cannot readily benefit from the experience of other P2P developers. Therefore, all the developers of new P2P applications have to pretty much start from setting up their own P2P network and building up their own libraries, which may have been successfully accomplished before by others already. Such efforts wasted in repetition could be better spent in developing features and functionality for new applications.

Besides the interoperability issue, there are other concerns about P2P networks, for example, peer nodes may be infected by virus or malwares contained in data shared; contents shared between peer nodes may not have authentic digital copyright management (DRM) information.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, apparatuses with a universal P2P service platform, and P2P networks formed with such apparatuses.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

Figure 1:
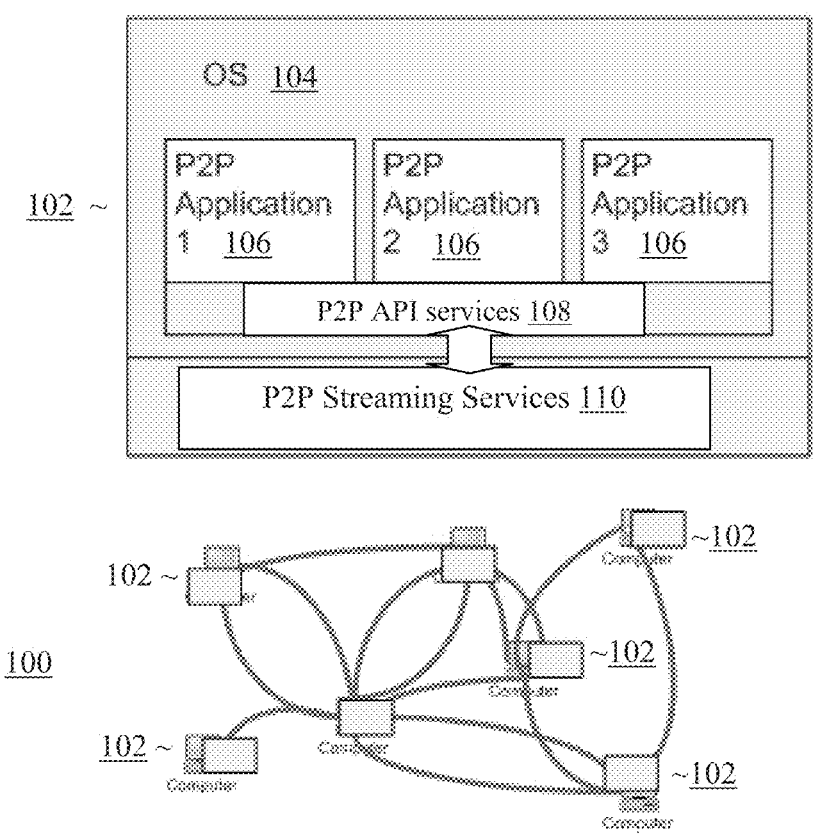
FIG. 1 shows an overview of a P2P network and a peer node in accordance with various embodiments.

FIG. 1 shows an overview of an apparatus such as a P2P node 102 with a unified P2P service platform, and a unified P2P network formed with such apparatuses, in accordance with various embodiments. As illustrated unified P2P network 100 includes a number of similarly constituted P2P nodes 102. Nodes 102 are similarly constituted in that each of the nodes is endowed with a universal P2P service platform comprising P2P API services 108 and P2P Streaming Services 110. P2P Streaming Services 110 is configured to provide P2P networking services for all P2P applications 106 executing on the node. P2P API services 108 are configured to facilitate P2P applications 106 to access P2P Streaming Services 110 of the platform for accessing the P2P network.

In various embodiments, P2P Streaming Services 110 comprise a super set of the low level infrastructure P2P network services that application designers have to provide their applications to form a P2P network with other nodes. These P2P network services are known in the art, and accordingly would not be further described. In various embodiments, P2P API Services 108 comprise a number of API calls for applications 106 to invoke the services of P2P Streaming Services 110. The organization of the API calls is implementation dependent, and may vary from implementations to implementations.

Thus, under embodiments of the invention, developers of P2P applications do not have to provide their own P2P services, but may utilize P2P Streaming Services 110 through P2P API services 108. Accordingly, unlike the prior art, where different applications executing on the different nodes forming different P2P networks, under embodiments of the invention, the various P2P networks are integrated into unified P2P network 100. Under embodiments of the invention, unified P2P network 100 provides for, among other things, better data sharing and network resource utilization. In various embodiments, in lieu of a software implementation in whole or in part, all or portion of P2P Streaming Services 110 may be implemented in firmware instead.

As will be described in more detail below (with reference to FIG. 2), in various embodiments, P2P API Services 108, P2P applications 106 and Operating System (OS) operate in one virtual machine, while P2P Streaming Services 110 operate in another virtual machine. Further, in various embodiments, P2P Streaming Services 110 operate as part of a manageability engine within a virtual machine dedicated to managing the particular node. Except for P2P API Services 108 and P2P Streaming Services 110, P2P Applications 106, OS 104, and the platforms they operate on, these elements may be any one of a number of implementations known in the art or to be designed. Example of P2P Applications 106 may include, but are not limited to, files and/or multi-media content sharing application. Example of OS 104 may include an implementation of the open source Linux operating system or a member of the Window® Operating System family, available from Microsoft of Redmond, Wash.

Figure 2:
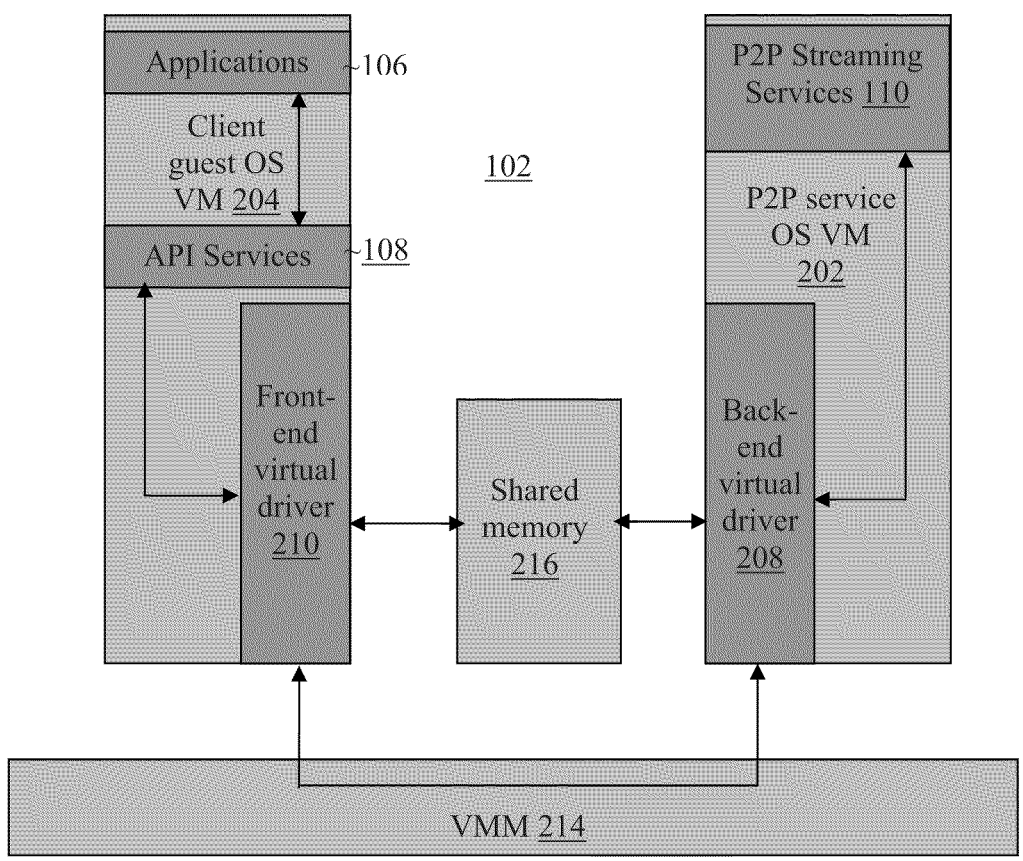
FIG. 2 illustrates an apparatus with a universal P2P service platform according to various embodiments.

FIG. 2 illustrates node 102 in further detail, in accordance with various embodiments. As illustrated, node 102 comprises shared memory 216, virtual machine manager (VMM) 214 and at least two virtual machines (VMs), coupled to each other as shown. Among the at least two virtual machines, one is the P2P service OS VM 202 and the other is the client guest OS VM 204.

P2P service OS VM 202 comprises P2P Streaming Services 110 and for the embodiments, a back end virtual driver 208, whereas client guest OS VM 204 comprises applications 106, API Services 108, and for the embodiments, front end virtual driver 210. The elements are coupled to each other as shown.

The P2P Streaming Services 110, as alluded to earlier, implement a super set of P2P streaming services as well as network services such as routing, searching, and communicating within the P2P network. Through the P2P Streaming Service 110, the P2P service OS VM 202 can work as a peer node in the unified P2P streaming network, on behalf of the various applications 106. The back end virtual driver 208 is configured to work with a front end virtual driver 210 in the client guest OS VM 204 for instruction or data communication between the two VMs.

The API Services 108 communicates with user applications and translates APIs into primitive instructions and data. The API Services 108 also calls the front end virtual driver 210 to notify the back end virtual driver 208 for instruction or data communication. The API Services 108 supply unified P2P streaming service APIs and transparent P2P streaming services to various user applications 106. The front end virtual driver 210 is configured to work with the back end virtual driver 208 to transmit instructions or data between the client guest OS VM 204 and the P2P service OS VM 202.

In various embodiments, virtual machine manager (VMM) 214 is configured to perform the conventional functions for facilitating the concurrent operations of the VMs. In various embodiments, event notifications between the VMs are transmitted via event channels in the VMM 214. Similarly, shared memory 216 is configured to perform the conventional storage function for multiple ones of the VMs. Stream media data or instructions may be stored in this shared memory 216 and accessed by user applications 106, API Services 108, and/or P2P Streaming Services 110 through the front end virtual driver 210 or the back end virtual driver 208.

Figure 3:
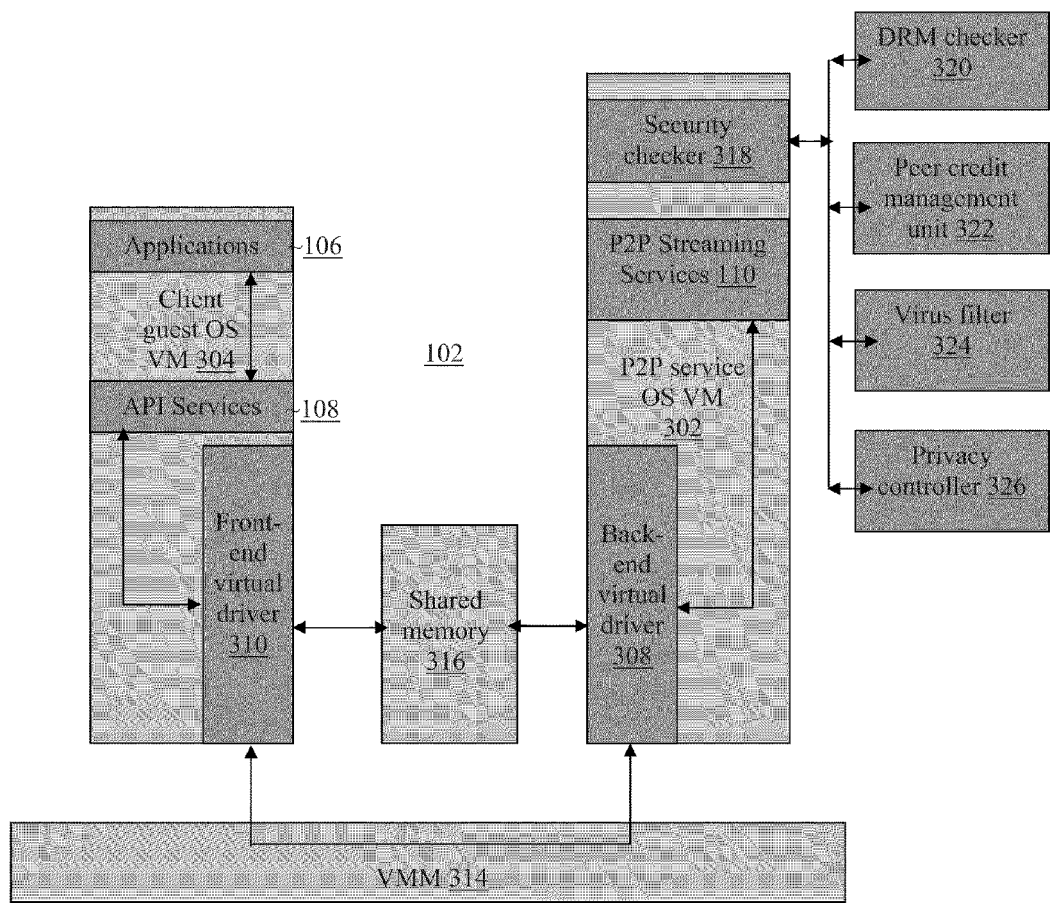
FIG. 3 illustrates an apparatus with a universal P2P service platform and a security checker according to embodiments.

FIG. 3 shows node 102 in yet further details in accordance with various embodiments. As illustrated, similar to the embodiments of FIG. 2, node 102 comprises shared memory 316, virtual machine manager 314 and at least two virtual machines (VMs), coupled to each other as shown. Among the at least two virtual machines, one is the P2P service OS VM 302 and the other is the client guest OS VM 304. P2P service OS VM 302 comprises P2P Streaming Services 110 and for the embodiments, a back end virtual driver 308, whereas client guest OS VM 304 comprises applications 106, API Services 108, and for the embodiments, front end virtual driver 310. In various embodiments, these embodiments are similarly constituted or implemented as the corresponding elements described with reference to FIG. 2.

However, additionally, for the embodiment of FIG. 3, P2P Service OS VM 302 further includes a security checker 318 configured to provide security functions for P2P networking. Security checker 318 may comprise several subordinate functional units. For the illustrated embodiments, the subordinate units may include a digital rights management (DRM) checker 320 configured to provide digit right management on the universal P2P network. The DRM checker 320 may be configured to check the DRM information of contents before they are shared in the P2P network, or accepted into a node for the node's applications. Furthermore, in various embodiments, DRM checker 320 may be configure to record the result of DRM checking as references to evaluate the credibility of a peer node.

In various embodiments, the subordinate units may include a peer credit management unit 322 configured to manage credibility of a peer node. Peer credit management unit 322 may be configured to operate a credit record system based on e.g., behaviors of each peer node. Such a credit management unit 322 may improve the reliability of a P2P system by forecasting the status of the P2P network. Various ways may be employed to calculate and manage the credit records. Factors like DRM information or upload/download speed may affect the credit record of a peer node.

In various embodiments, a virus filter 324 may be another subordinate unit of the security checker 318. This virus filter 324 may be configured to monitor the data transferred and detect for the presence of virus and/or other malicious data. This virus filter 324 may be configured to isolate a peer node from the P2P network if any data with virus or other malicious are found to be present in the data transmitted by the peer node.

In various embodiments, the security checker 318 may further include a privacy controller 326 configured to provide privacy on the universal P2P network, enabling certain applications to ensure private or confidential data are shared within a trusted peer group only. In various embodiments, privacy controller 326 may use security mechanisms such as X.509 etc, to build a trusted peer group within which all sessions are secured for private contents sharing.

Additionally, those skilled in the art would appreciate that, besides the security accorded by security checker 318, the implementation of the universal P2P service platform in virtual machines further provide additional security by virtual of the separation of the P2P operations from the operations of the local operating system and its applications.

Figure 4:
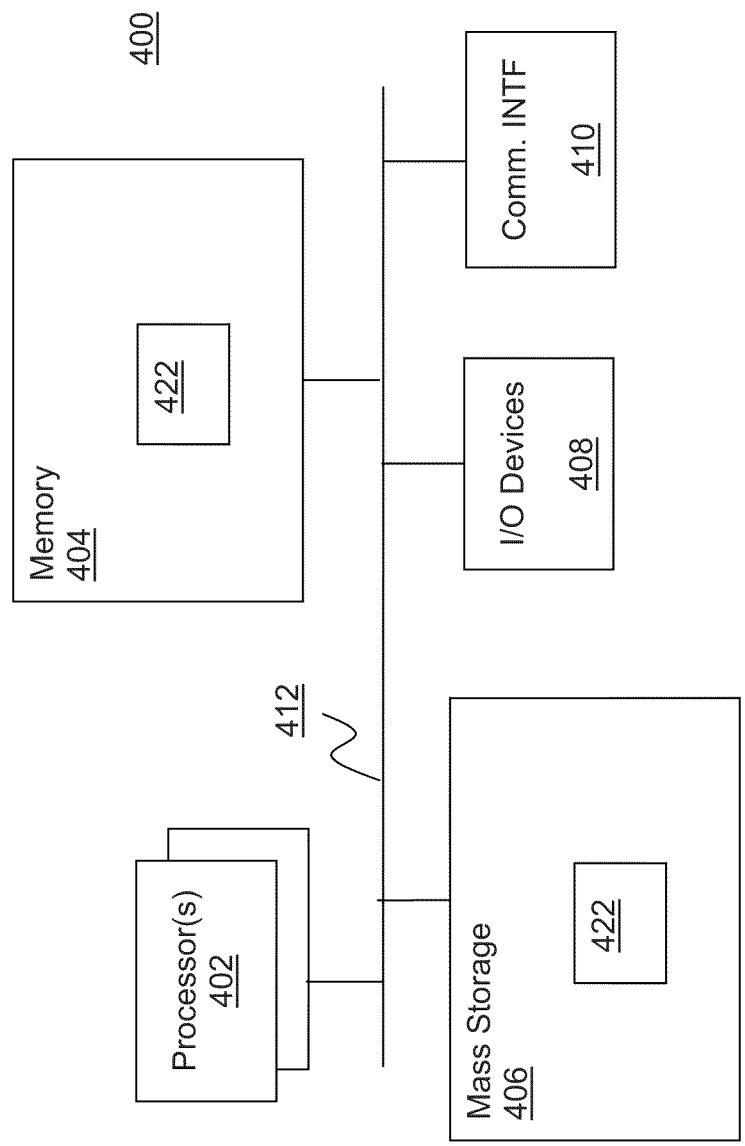
FIG. 4 illustrates an example computer system suitable for practicing embodiments of the invention.

FIG. 4 illustrates an example computer system suitable for use to practice various embodiments of the present invention. As shown, computing system 400 includes one or more processors 402, and system memory 404. Additionally, computing system 400 includes mass storage devices 406 (such as diskette, hard drive, CDROM and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not shown).

Each of these elements performs its conventional functions known in the art. In particular, system memory 404 and mass storage 406 may be employed to store a working copy and a permanent copy of the programming instructions implementing some or all of the earlier described functions, such as applications 106, API services 108, P2P Streaming Services 110, front end and back end drivers 208/308 and 210/310, VMM 214/314, and/or security checker 318, collectively denoted as instructions 422. The various components may be implemented as assembler instructions supported by processor(s) 402 or high level languages, such as C, that can be compiled into such instructions.

The permanent copy of the programming instructions may be placed into permanent storage 406 in the factory, or in the field, through, for example, a distribution medium (not shown), such as a compact disc (CD), or through communication interface 410 (from a distribution server (not shown)).

The constitution of these elements 402-412 are known, and accordingly will not be further described.

In various embodiments, computer system 400 may be a server, a desktop computer, a laptop computer, a tablet computer or a smart phone. In other embodiments, the universal P2P service platform may also be embedded in a media player, a game console, a set-top box, or a digital recorder. For example, if the platform is a PC, the user may make a selection between the OS of the PC or P2P for different operations, and different types of P2P services will be searchable and available for user selections.

Because of the integration of network resource, the unified P2P network may be further adapted to deal with high performance computing application. Service providers may lease the P2P computing resources to high performance computing applications which pay credits according to the amount of calculation, and then service provider allocates credits according to participation of each peer node. Based on the unified P2P network, a simpler high performance computing model may be built, and further contributes to the grid computing application service.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. An apparatus comprising:
   one or more processors;
   memory coupled to the one or more processors;
   a virtual machine manager to manage a plurality of virtual machines; and
   a peer-to-peer service platform including:
     a collection of peer-to-peer streaming services to be operated in a first virtual machine of the plurality of virtual machines; and
     a collection of peer-to-peer application programming interface (API) services to be instantiated in a second virtual machine of the plurality of virtual machines to receive one or more API service calls from a plurality of applications operated in the second virtual machine and enable the plurality of applications disposed on the second virtual machine to access a unified peer-to-peer network, through the peer-to-peer streaming services disposed in the first virtual machine,
   wherein the peer-to-peer streaming services and the peer-to-peer API services are part of a peer node in the unified peer-to-peer network, wherein the first virtual machine includes a first operating system, wherein the second virtual machine includes a second operating system, and wherein the first and second virtual machines are different virtual machines.

2. The apparatus of claim 1, further comprising a back end driver to be operated in the first virtual machine and a front-end driver to be operated in the second virtual machine, wherein the front-end driver and the back end driver are to communicate with each other to enable communication between the two virtual machines, including communication between the peer-to-peer application programming interface services and the peer-to-peer streaming services.

3. The apparatus of claim 2, further comprising a security checker to be operated in the first virtual machine to enable secure communication with other peer nodes in the unified peer-to-peer network.

4. The apparatus of claim 3, wherein the memory is to store at least content for the apparatus and the security checker comprises a digital rights management checker to check digital rights management information of content stored on the apparatus before sharing the content via the unified peer-to-peer network.

5. The apparatus of claim 3, wherein the security checker further comprises a peer credit management unit to operate a credit record system based on behaviors of each peer node in the unified peer-to-peer network to evaluate and record credits of each peer node, wherein the behaviors include at least one of digital rights management of the peer node, upload speed of the peer node, download speed of the peer node, or a level of participation in grid computing application services of the peer node.

6. The apparatus of claim 3, wherein the security checker further comprises a virus filter to monitor data transmitted within the unified peer-to-peer network for presence of a virus or malicious data, wherein the virus filter is to isolate a peer node from the unified peer-to-peer network upon detection of the presence of a virus or malicious data in the data transmitted by the peer node.

7. The apparatus of claim 3, wherein the security checker further comprises a privacy controller to restrict communications within a trusted group of peer nodes of the unified peer-to-peer network, and wherein the privacy controller is to secure communications between peer nodes of the trusted group via encryption of the communications.

8. The apparatus of claim 1, wherein the apparatus is assigned to perform calculations for a grid computing application service in the unified peer-to-peer network.

9. The apparatus of claim 1, wherein the apparatus is a selected one of a server, a desktop computer, a laptop computer, a tablet computer or a smart phone.

10. The apparatus of claim 1, wherein the apparatus is a selected one of a media player, a game console, a set-top box, or a digital recorder.

11. An article of manufacture comprising:
    a non-transitory storage medium;
    a plurality of programming instructions stored on the storage medium which, when executed by a processor of a computing device, provides the computing device with:

a peer-to-peer service platform including:
  a collection of peer-to-peer streaming services to be operated in a first virtual machine, with a first operating system, of an apparatus to work in a unified peer-to-peer network, on behalf of a plurality of applications operated in a second virtual machine, with a second operating system, of the apparatus; and
  a collection of peer-to-peer application programming interface (API) services to be operated in the second virtual machine of the apparatus to receive one or more API service calls from the plurality of applications and enable the plurality of applications operated on the second virtual machine to access the unified peer-to-peer network through the peer-to-peer streaming services operated in the first virtual machine of the apparatus, wherein the peer-to-peer streaming services and the peer-to-peer API services are part of a peer node in the unified peer-to-peer network, and wherein the first and second virtual machines are different virtual machines.

12. The article of claim 11, wherein the plurality of programming instructions, when executed by the processor, further provide the computing device with a back end driver to be operated in the first virtual machine and a front-end driver to be operated in the second virtual machine, wherein the front-end driver and the back end driver are to communicate with each other to enable communication between the two virtual machines.

13. The article of claim 11, wherein the plurality of programming instructions, when executed by the processor, provide the computing device with a security checker, as part of the peer-to-peer streaming services, to enable secure communication with other nodes in the unified peer-to-peer network via encryption or decryption of the communication.

14. A method comprising:
  operating a collection of peer-to-peer streaming services in a first virtual machine, with a first operating system, of a computing device in a unified peer-to-peer network;
  providing a collection of peer-to-peer application programming interface (API) services in a second virtual machine, with a second operating system, of the computing device to enable a plurality of applications operated in the second virtual machine to access the unified peer-to-peer network through the peer-to-peer streaming services operated in the first virtual machine of the computing device, wherein the peer-to-peer API services and the peer-to-peer streaming services are part of a single peer node in the unified peer-to-peer network;
  operating a back end driver in the first virtual machine and a front-end driver in the second virtual machine, wherein the front-end driver and the back end driver communicate with each other to enable the plurality of applications to access the unified peer-to-peer network; and
  monitoring, by a security checker, as part of the peer-to-peer streaming services, data transmitted between the peer node and other peer nodes in the unified peer-to-peer network to detect a virus or malicious data present in the data transmitted,
  wherein the computing device is assigned to perform calculations for a grid computing application service in the unified peer-to-peer network, wherein the unified peer-to-peer network includes a plurality of peer-to-peer service platforms that run peer-to-peer API functionality and peer-to-peer streaming services in separate virtual machines, wherein the first virtual machine and the second virtual machine are part of a peer-to-peer service platform, and wherein the first and second virtual machines are different virtual machines.

15. The method of claim 14, further comprising isolating one of the other peer nodes from the unified peer-to-peer network in response to the detection of a computer virus and/or other malicious data present in the data transmitted from the one of the other peer nodes.

16. The method of claim 14, further comprising evaluating behaviors of each peer node and recording credits of each peer node based on results of the evaluation, wherein the behaviors include at least one of digital rights management, upload speed, download speed, or a level of participation in grid computing application services.

17. The apparatus of claim 1, further comprising:
  a back end driver to be operated in the first virtual machine and a front-end driver to be operated in the second virtual machine, wherein the front-end driver and the back end driver are to communicate with each other to enable communication between the two virtual machines, including communication between the peer-to-peer application programming interface services and the peer-to-peer streaming services;
  a security checker to be operated in the first virtual machine to enable secure communication with other nodes in the unified peer-to-peer network via encryption or decryption of the communications;
  wherein the apparatus is assigned to perform calculations for a grid computing application service in the unified peer-to-peer network.

18. The article of manufacture of claim 11, wherein the plurality of instructions, when executed by the processor further provide the computing device with:
  a back end driver to be operated in the first virtual machine and a front-end driver to be operated in the second virtual machine, wherein the front-end driver and the back end driver are to communicate with each other to enable communication between the two virtual machines, including communication between the peer-to-peer application programming interface services and the peer-to-peer streaming services;
  a security checker, as part of the peer-to-peer streaming services, to enable secure communication with other nodes in the unified peer-to-peer network; and
  a calculation service to perform calculations for a grid computing application service in the unified peer-to-peer network.

* * * * *